Patented Sept. 15, 1931

1,823,024

UNITED STATES PATENT OFFICE

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN

PURIFICATION OF ARYLAMINES

No Drawing.   Application filed February 15, 1929.   Serial No. 340,336.

In the method of making a primary arylamine wherein a mono-halogenated aromatic hydrocarbon is reacted with aqueous ammonia solution at an elevated temperature and pressure and in the presence of a copper compound as catalyst, the resulting reaction product separates upon standing into an aqueous layer containing chiefly ammonia, ammonium chloride and copper salt in solution, and an oily layer consisting chiefly of the primary arylamine product and a lesser amount of the corresponding phenolic compound, together with relatively small amounts of the corresponding secondary amine, diarylether and other compounds. The oil layer also contains traces of water, ammonium salt and copper compounds. Such oil layer is separated from the aqueous layer and treated for the purification of the primary arylamine product. The latter procedure involves numerous practical difficulties, arising principally from the persistency with which the phenolic compound frequently accompanies the primary arylamine through the various purification steps.

For example in the manufacture of aniline by reacting between chlorbenzene and aqueous ammonia solution with a cuprous compound as catalyst, the oil layer so obtained contains, in addition to aniline, from 3 to 8 per cent of phenol, along with smaller amounts of diphenylamine, diphenyl oxide, copper and ammonia compounds. In purifying this product the complete separation of phenol presents considerable difficulty.

The formation of such phenol is unavoidably connected with the aforesaid process, being due to the hydrolytic action of water present. While in practice hydrolysis is largely restrained by providing a large excess of ammonia, nevertheless a certain condition of equilibrium between the reacting components exists, such that a definite modicum of phenol is always produced. A procedure for effecting a substantially quantitative separation of such phenol from the aniline is essential for obtaining a pure water-white product that is permanent and will remain for a long period without material discoloration. To the accomplishment of the foregoing and related ends the invention, then, consists of the steps hereinafter fully described and particularly pointed out in the claims, the following description setting forth in detail certain procedure whereby the principle of the invention may be used.

As previously stated, the reaction mixture derived from the aforementioned process for the manufacture of an arylamine, e. g. aniline, separates upon standing into an aqueous and an oily layer, the former containing excess ammonia, and soluble ammonia and copper compounds together with small amounts of aniline and phenol in solution, while the latter consists of the bulk of the crude aniline product together with unreacted chlorbenzene and organic impurities such as phenol, diphenylamine, diphenyl oxide, etc., as well as traces of ammonia and copper compounds. On boiling the aqueous layer the aniline and phenol content thereof is steamed out, collected by suitable means and added to the oily layer.

The oily layer is treated with barium hydrate in quantity sufficient to neutralize and fix the phenol, as barium phenate, break up the ammonia compounds and precipitate the copper compounds. Such barium hydrate may be added either as crystals approximately of compositon $Ba(OH)_2.8H_2O$, or as an aqueous solution thereof. The mixture is thereupon distilled, conveniently at atmospheric pressure, to drive off, first, ammonia and then all of the water. A small amount of chlorbenzene and aniline is carried over with the steam and is recovered from the distillate, being returned either to the initial reaction or to the main body of crude aniline remaining in the still, depending upon the proportions of chlorbenzene and aniline contained therein.

I have found that barium phenate may be heated in the presence of water at boiling temperature without materially undergoing hydrolysis or decomposition. This behavior distinguishes the barium phenate from the corresponding calcium compound, the latter being strongly hydrolyzed under the conditions as just described. Accordingly, if one attempted to distill the water out of a mixture of aniline, water and calcium phenate, the latter compound would be more or less completely hydrolyzed by the water present and phenol would be reformed, thus defeating the purpose of the operation.

After distilling off water as just described the crude aniline is obtained in a substantially anhydrous condition, the phenol content thereof being present as dry barium phenate. The mixture is now distilled, preferably under reduced pressure, e. g. about 23 to 27 inches vacuum. The first fraction coming over contains the chlorbenzene, this being returned to the original reaction. Pure aniline then distills over as a clear water-white product. When distillation is completed a heavy, semi-solid residue is left in the still, such residue containing barium phenate, diphenylamine, diphenyl oxide, copper compounds and tarry decomposition products. Water is then added to the still to dissolve up such phenate, and the aqueous mixture is distilled to drive off small amounts of residual aniline retained therein, the latter being slightly impure so that after recovery it is preferably added to a succeeding charge of crude aniline to the still. The still contents are then drained off and filtered to separate the insoluble sludge from the clear solution of barium phenate. The sludge containing copper compounds may be returned to the original reaction for the purpose of supplying part of the cuprous compound as catalyst therein. The phenate solution may be acidified to liberate free phenol, the latter being separated and purified in the usual way, while the barium compound may be recovered and, if desired, converted to the hydrate for reuse in the process.

The efficacy of the foregoing method for purifying the crude aniline product and separating it from accompanying phenol is believed to lie, at least in large part, in transforming such phenol into a metallic phenate substantially non-hydrolyzed under the conditions of operation, thereby permitting complete separation of water from the crude material without material decomposition or hydrolysis taking place therein. Examples of such relatively non-hydrolyzed metallic phenates are the phenates of the alkali metals and barium. On the other hand calcium phenate, for example, is readily hydrolyzed in the presence of water, hence the present procedure cannot be employed therewith. After the preliminary separation of water and fixation of phenol, the aniline product may be distilled from the anhydrous mixture and recovered in a state of exceptional purity, the purified product being markedly superior to that heretofore obtainable by other methods. Furthermore residual raw materials and by-products are recovered, losses of the values contained therein being almost negligible.

By analogous procedure the crude arylamine product from the reaction between a halogenated aromatic hydrocarbon and aqueous ammonia, generally, with or without the use of a catalyst, may be most advantageously worked up and purified. The herein described method is likewise equally adapted for separating and purifying mixtures of arylamines and phenols, generally, however derived.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention.

1. In a method of purifying the crude arylamine product of a reaction between a halogenated aromatic hydrocarbon and aqueous ammonia solution, said product also containing a relatively small amount of a phenolic compound, the steps which consist in treating said crude product with barium hydrate in amount sufficient to convert said phenolic compound to phenate, removing water therefrom by distillation, and then distilling said arylamine from the resulting anhydrous mixture.

2. In a method of purifying the crude aniline product of a reaction between chlorbenzene and aqueous ammonia solution, said product also containing a relatively small amount of phenol, the steps which consist in treating said crude product with barium hydrate in amount sufficient to convert said phenol to phenate, removing water therefrom by distillation, and then distilling said aniline from the resulting anhydrous mixture.

3. The method of separating an arylamine and a relatively small amount of a phenol in admixture together which comprises treating the mixture with barium hydrate in amount sufficient to convert such phenol to phenate, removing water therefrom by distillation, and then distilling said arylamine from the resulting anhydrous mixture.

4. The method of separating aniline and a relatively small amount of phenol in admixture together which comprises treating the mixture with barium hydrate in amount sufficient to convert such phenol to phenate, removing water therefrom by distillation, and then distilling said aniline from the resulting anhydrous mixture.

Signed by me this 5 day of Feb., 1929.

EDGAR C. BRITTON.